US010647580B2

(12) United States Patent
Ye et al.

(10) Patent No.: US 10,647,580 B2
(45) Date of Patent: May 12, 2020

(54) THREE-DIMENSIONAL DETERMINISTIC GRAPHENE ARCHITECTURES FORMED USING THREE-DIMENSIONAL TEMPLATES

(71) Applicant: Lawrence Livermore National Security, LLC, Livermore, CA (US)

(72) Inventors: Jianchao Ye, Tracy, CA (US); Juergen Biener, San Leandro, CA (US); Patrick Campbell, Oakland, CA (US); Wen Chen, Livermore, CA (US); Julie A. Jackson, Livermore, CA (US); Bryan D. Moran, Pleasanton, CA (US); James Oakdale, Castro Valley, CA (US); William Smith, Oakland, CA (US); Christopher Spadaccini, Oakland, CA (US); Marcus A. Worsley, Hayward, CA (US); Xiaoyu Zheng, Blacksburg, VA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 417 days.

(21) Appl. No.: 15/417,134

(22) Filed: Jan. 26, 2017

(65) Prior Publication Data

US 2018/0208467 A1 Jul. 26, 2018

(51) Int. Cl.
*B32B 9/00* (2006.01)
*C01B 32/182* (2017.01)
(Continued)

(52) U.S. Cl.
CPC ............ *C01B 32/182* (2017.08); *B33Y 10/00* (2014.12); *B33Y 70/00* (2014.12); *C01B 32/184* (2017.08); *C01B 32/186* (2017.08); *B82Y 30/00* (2013.01); *B82Y 40/00* (2013.01); *C01B 2204/02* (2013.01); *C01P 2004/03* (2013.01);
(Continued)

(58) Field of Classification Search
None
See application file for complete search history.

(56) References Cited

U.S. PATENT DOCUMENTS 7,781,098 B2 * 8/2010 Chiang .................... H01M 4/04
204/288
9,278,465 B1 * 3/2016 Worsley ................ B33Y 10/00
(Continued)

OTHER PUBLICATIONS

Zhu et al., "Highly compressible 3D periodic graphene aerogel microlattices", Apr. 2015, Nature Communications, DOI: 10.1038/ncomms7962, pp. 1-8.*
Zhu et al., "Supercapacitors Based on Three-Dimensional Hierarchical Graphene Aerogels with Periodic Macropores", Jan. 2016, Nano Letters, vol. 16, pp. 3448-33456.*
(Continued)

Primary Examiner — Seth Dumbris
(74) Attorney, Agent, or Firm — Zilka-Kotab

(57) ABSTRACT

In one embodiment, a composition of matter includes: a plurality of ligaments each independently comprising one or more layers of graphene; where the plurality of ligaments are arranged according to a deterministic three-dimensional (3D) pattern. In another embodiment, a method of forming a deterministic three-dimensional (3D) architecture of graphene includes: forming or providing a substrate structurally characterized by a predefined 3D pattern; forming one or more layers of metal on surfaces of the substrate; and forming one or more layers of graphene on surfaces of the metal.

19 Claims, 12 Drawing Sheets

200

(51) Int. Cl.
    *B33Y 10/00*     (2015.01)
    *B33Y 70/00*     (2020.01)
    *C01B 32/184*     (2017.01)
    *C01B 32/186*     (2017.01)
    *B82Y 40/00*     (2011.01)
    *B82Y 30/00*     (2011.01)

(52) U.S. Cl.
    CPC ........ *Y10S 977/734* (2013.01); *Y10S 977/842* (2013.01); *Y10T 428/30* (2015.01)

(56) References Cited

U.S. PATENT DOCUMENTS

| | | | |
|---|---|---|---|
| 9,533,887 B1* | 1/2017 | Polsky | C01B 32/20 |
| 2014/0120270 A1* | 5/2014 | Tour | C23C 16/26 |
| | | | 427/596 |
| 2017/0081534 A1* | 3/2017 | Shah | C09D 11/033 |
| 2017/0209622 A1* | 7/2017 | Shah | C09D 11/102 |

OTHER PUBLICATIONS

Osa et al., "Printing of Graphene Nanoplatelets into Highly Electrically Conductive Three-Dimensional Porous Macrostructures", Aug. 2016, Chem. Mater., vol. 28, pp. 6321-6328.*

Chen et al., "Three-dimensional flexible and conductive interconnected graphene networks grown by chemical vapour deposition," Nat. Mat. vol. 10, 2011, pp. 1-13.

Kim et al., "Atomic Layer Deposition of Ni Thin Films and Application to Area-Selective Deposition," Journal of the Electrochemical Society, vol. 158, No. 1, 2011, pp. D1-D5.

Graphene Supermarket, "Graphene Supermarket: Graphene Foam ," May 28, 2016, pp. 1-2, as retrieved by the Internet Archive Wayback Machine, https://web.archive.org/web/20160528225301/https://graphene-supermarket.com/3D-Graphene-Foams/.

American Elements, "Nickel Foam," Sep. 10, 2016, pp. 1-11, as retrieved by the Internet Archive Wayback Machine, https://web.archive.org/web/20160910034027/https://www.americanelements.com/nickel-foam-7440-02-0.

* cited by examiner

US 10,647,580 B2

THREE-DIMENSIONAL DETERMINISTIC GRAPHENE ARCHITECTURES FORMED USING THREE-DIMENSIONAL TEMPLATES

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The presently disclosed inventive concepts relate to three-dimensional (3D) graphene architectures, and more particularly to deterministic 3D graphene architectures formed using 3D printed templates.

BACKGROUND

Graphene is a material with well-documented and advantageous properties including excellent electrical conductivity, tensile strength, and unique atomic arrangement in a two-dimensional (2D) plane, among others. Accordingly, graphene is a material of great interest and continues to be investigated in new, interesting and useful applications across a wide variety of technical fields including biology, chemistry, materials science, semiconductor applications, etc.

Some such applications require, or would greatly benefit from, employing graphene in 3D arrangements. However, accomplishing this feat while retaining the desired properties conveyed by graphene is difficult in part due to the unique 2D structure of graphene, which conveys or strongly contributes to the characteristics for which graphene is desired in the particular application.

One existing approach, employed by Chen, et al. "Three-dimensional flexible and conductive interconnected graphene networks grown by chemical vapour deposition," *Nat. Mat.* 10, 424-428 (2011) to form a 3D graphene structure includes depositing graphene onto a nickel foam substrate, and etching away the nickel substrate to obtain a graphene foam. While Chen's structure is a 3D matrix comprising graphene, the structure is characterized by random or stochastic distribution of the graphene throughout the matrix (e.g. as opposed to an ordered structure), and accordingly suffers with respect to mechanical strength and electronic properties compared to expected properties for a corresponding structure of pure crystalline-phase graphene.

Accordingly, it would be highly beneficial to provide 3D graphene structures which exhibit controlled, deterministic architectures and retain graphene with desired high degree of crystallinity, as well as methods of making the same.

SUMMARY

In one embodiment, a composition of matter includes: a plurality of ligaments each independently comprising one or more layers of graphene; where the plurality of ligaments are arranged according to a deterministic three-dimensional (3D) pattern.

In another embodiment, a method of forming a deterministic three-dimensional (3D) architecture of graphene includes: forming or providing a substrate structurally characterized by a predefined 3D pattern; forming one or more layers of metal on surfaces of the substrate; and forming one or more layers of graphene on surfaces of the metal.

Other aspects and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

As also used herein, the term "about" when combined with a value refers to plus and minus 10% of the reference value. For example, a length of about 1 μm refers to a length of 1 μm±0.1 μm.

It must also be noted that, as used in the specification and the appended claims, the singular forms "a," "an" and "the" include plural referents unless otherwise specified.

As employed herein, the term "independently" when modifying members of a group will be understood to mean that each member of the group individually satisfies the stated condition independent of other members. For example, "a plurality of ligaments each independently comprising one or more layers of graphene" encompasses (1) embodiments in which all ligaments individually comprise a different graphene layer or set of graphene layers; and (2) embodiments in which all ligaments comprise the same one or more graphene layer(s).

The presently disclosed inventive 3D graphene architectures are characterized by a deterministic structure or arrangement which can be both ordered and/or disordered depending on the desired properties, e.g. as conferred via forming the architecture using a 3D printed substrate according to a predefined pattern, forming the architecture using additive manufacturing, etc. As referenced herein, the term "deterministic" shall be understood as a structure that can be engineered at multiple length scales. Which may be ordered or not, isotropic or anisotropic, uniform or hierarchically structured. Any complexity can be realized in contrast to self-assembly based template formation processes. The terms "deterministic pattern," "deterministic structure," "deterministic arrangement," "ordered structure" and "ordered arrangement" shall be understood as distinct from structures defined by a random or stochastic arrangement or pattern.

Figure 1A:
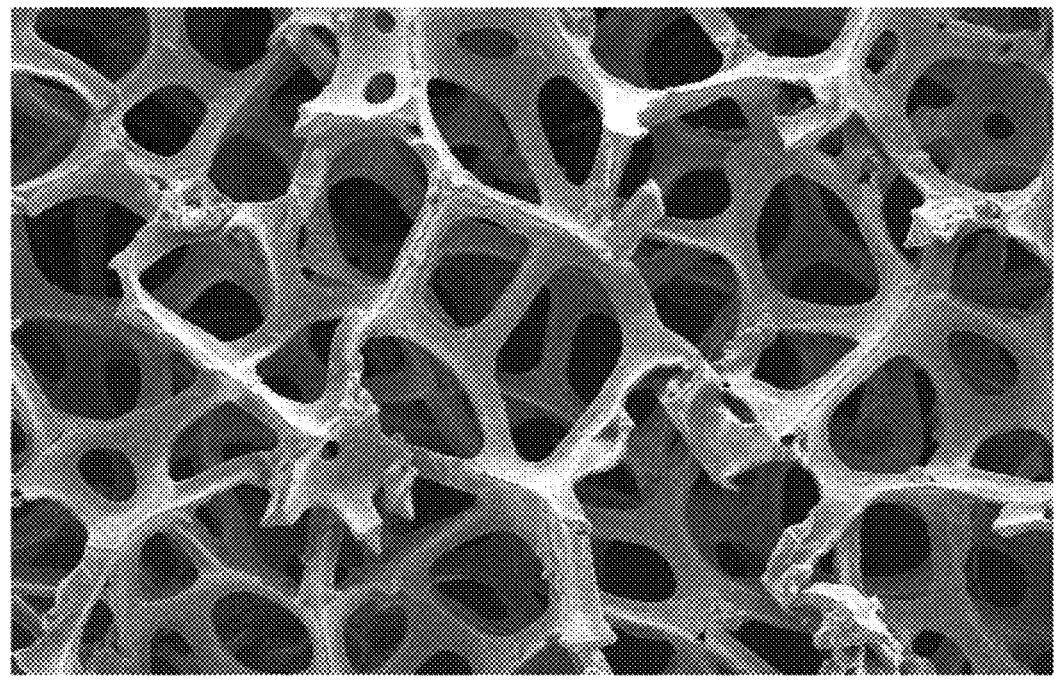
FIG. 1A is a scanning electron micrograph (SEM) image of a conventional 3D graphene architecture characterized by a random or stochastic arrangement of graphene ligaments.
Figure 1B:
FIG. 1B is a zoomed-in SEM image of a defect present in the conventional 3D graphene architecture shown in FIG. 1A.

An exemplary conventional architecture 100 characterized by a random or stochastic structure/arrangement is shown in FIG. 1A. Since random/stochastic structures are generally formed via random or stochastic self-assembly of units into the final structure, as opposed to formation in a predefined manner or according to a predefined pattern, it will be understood that "predefined" structures, patterns, etc. are synonymous with "ordered" structures, patterns, etc. for the purposes of the present disclosure.

Random and/or stochastic structural arrangements may be formed using various techniques, and are generally the default arrangement achieved using such techniques, in the absence of external control or influence to direct the formation of the structure into a deterministic arrangement. For example, random or stochastic structures are generated when forming conventional metal "foams," e.g. by dealloying an alloy to render a highly porous network of ligaments. Random and/or stochastic structures are also formed by reducing a graphene oxide bulk material into a reduced graphene oxide (RGO) structure. Further still, random or stochastic structures are generated by gelation, curing, and drying of a sol-gel mixture to form aerogels, xerogels, etc. Random and/or stochastic structures may be generated using other similar fabrication techniques that will be appreciated by a person having ordinary skill in the art upon reading the present descriptions.

As referred-to herein, a "three-dimensional pattern" shall be understood as meaning patterns in which all three principal dimensions (height, width, length) have non-trivial magnitude. For example, although a single layer of atoms arranged in a substantially two-dimensional sheet (e.g. graphene) technically is a three-dimensional structure since the structure occupies a non-zero volume, such structure would not meet the definition of "three-dimensional pattern" as contemplated herein. Examples of three-dimensional patterns include spheres, rods, polygonal trusses, alternating stacked layers of a monolithic structure, etc. as represented according to several exemplary embodiments in FIGS. 2A-6C, and as would be understood by a person having ordinary skill in the art upon reading the present descriptions.

As described herein, "features" should be understood to include any suitable component, portion, etc. of a three-dimensional structure, as would be understood by a person having ordinary skill in the art upon reading the present descriptions. For instance, in various embodiments, features may include protrusions, depressions, voids, lattices, channels, pockets, pillars, points, overhangs, cantilevers, positive features at various angles, etc. as skilled artisans will appreciate upon reviewing the instant disclosure. Generally, and due to the high level of precision afforded by PμSL, any of the foregoing features may be formed at nearly any angle.

The following description discloses several preferred embodiments of ordered, three-dimensional (3D) graphene architectures formed using 3D printed templates, and methods of making the same.

In one general embodiment, a composition of matter includes: a plurality of ligaments each independently comprising one or more layers of graphene; where the plurality of ligaments are arranged according to a deterministic three-dimensional (3D) pattern.

In another general embodiment, a method of forming a deterministic three-dimensional (3D) architecture of graphene includes: forming or providing a substrate structurally characterized by a deterministic 3D pattern; forming one or more layers of metal on surfaces of the substrate; and forming one or more layers of graphene on surfaces of the metal.

Turning now to FIG. 1A, and by way of contrast from an ordered 3D graphene architecture, a SEM image of a random or stochastic 3D graphene architecture 100 is shown. The randomly arranged structure may be fabricated by growing graphene onto a metal foam as described by Chen, et al.

"Three-dimensional flexible and conductive interconnected graphene networks grown by chemical vapour deposition," *Nat. Mat.* 10, 424-428 (2011). Since the metal foam serving as the template substrate onto which graphene are deposited exhibits a randomly or stochastically arranged structure, so too does the resulting graphene architecture.

This randomly arranged structure conveys several disadvantages to the final graphene architecture. For instance, self-assembled graphene layers tend to form broken or truncated ligaments, and the ligaments tend to be of a relatively large size (diameter). As would be understood by a person having ordinary skill in the art, these characteristic present a limitation on the utility of the conventional, stochastically arranged structures. The stochastically arranged structures lack of continuity of ligaments across the structure which can negatively impact the performance of the material (e.g. for applications where conductivity is important, the deterministic structures exhibit far superior performance, analogous to the difference between attempting to carry a current across a globular mesh of randomly arranged wires versus a defined circuit path). Those having ordinary skill in the art will appreciate that other performance characteristics important to other applications may also be dramatically improved by the use of a deterministic structure, e.g. mechanical strength is improved by using a deterministic structure compared to a stochastically arranged structure because the aspect ratio of the structures formed using techniques described herein may be much smaller than those produced using conventional techniques.

The presently disclosed inventive concepts accordingly employ a deterministic structure, and in some embodiments may use a polymer substrate as a solid source of carbon rather than using volatile hydrocarbons as gas phase precursor species, e.g. for conventional chemical vapor deposition (CVD) of graphene onto a surface. CVD-based approaches disadvantageously limit the size of the structure that can be homogeneously templated as the carbon precursor gas is supplied from the outside, and diffusion limitations lead to thicker graphene films on the outside compared to the interior of the structure. By using the polymer substrate as the carbon source, diffusion limitations do not exist as the carbon is already in place in form of the polymer template, thereby avoiding the size limitations for homogenous templating associated with CVD. In addition, using polymer as the carbon source allows forming carbon and/or graphene onto the metal-coated surfaces of the template at lower temperatures than conventional CVD-based approaches.

Figure 2A:
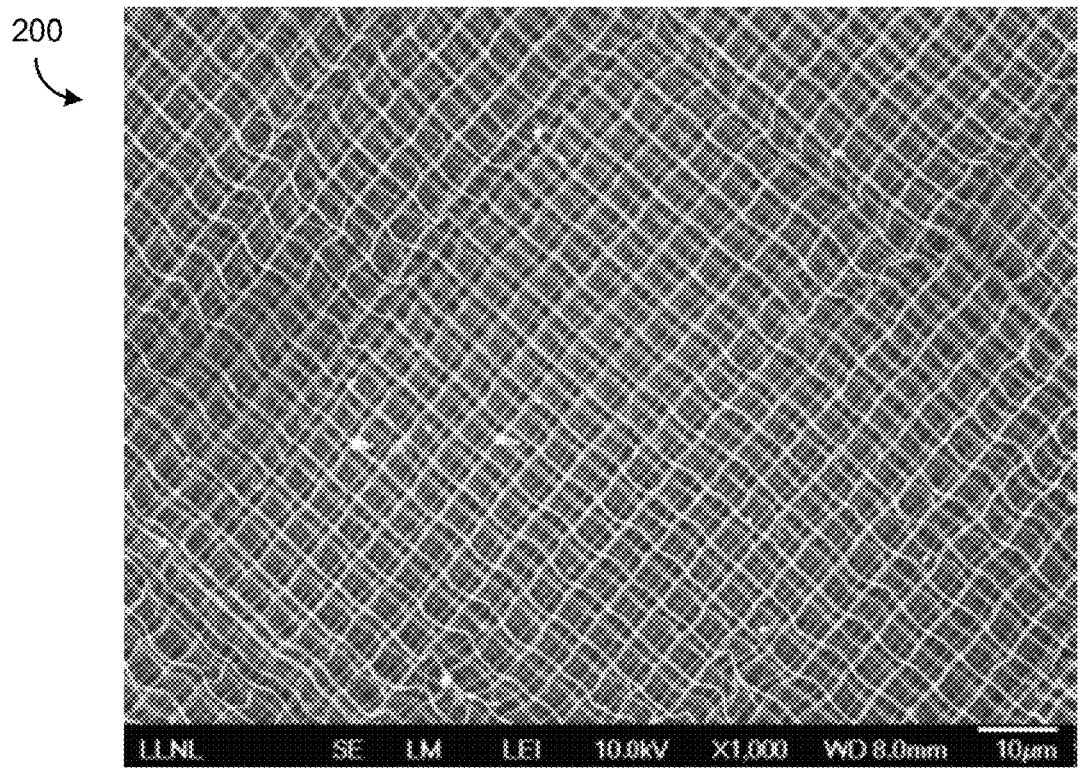
FIG. 2A is a SEM image of a 3D graphene architecture exhibiting a deterministic structure, according to one embodiment.
Figure 2B:
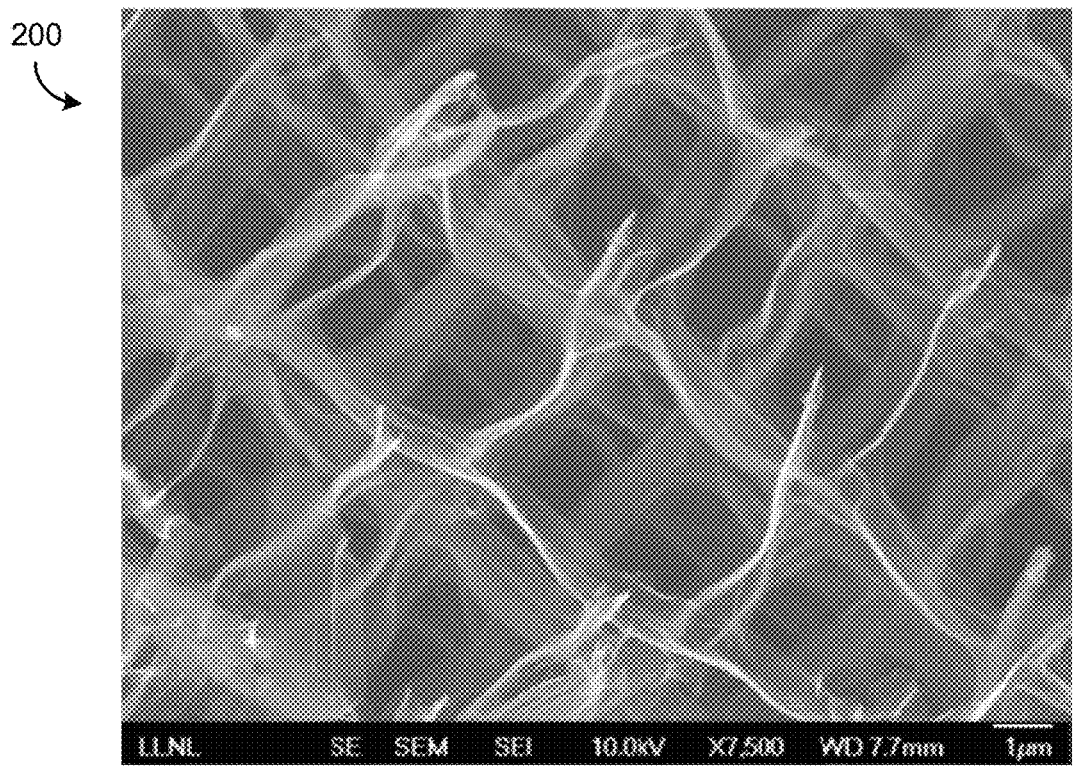
FIG. 2B shows a zoomed-in SEM image of the deterministic 3D graphene architecture depicted in FIG. 2A, according to one embodiment.

According to one embodiment of the presently disclosed inventive concepts, a SEM image of an ordered 3D graphene architecture 200 is shown in FIG. 2A, and a more magnified view showing individual ligaments of the architecture 200 is presented in FIG. 2B. As will be appreciated by a skilled artisan reading these descriptions in light of the figures, the architecture 200 shown in FIGS. 2A-2B is ordered into a substantially square lattice arrangement, with graphene ligaments forming individual strips of the lattice.

In general, the ordered structure of the inventive 3D graphene architectures presented herein, including architecture 200 as shown in FIGS. 2A-2B, may be achieved by utilizing a substrate that conveys the ordered nature to the final 3D graphene architecture. In the context of the present disclosure, the polymer substrates employed are preferably formed by additive manufacturing techniques such as direct ink writing (DIW), selective laser melting (SLM), projection micro stereolithography (PμSL), and/or two-photon polymerization (2PP) direct laser writing (e.g. 2PP technology is exemplified by products produced by Nanoscribe, GmbH).

In various embodiments, the particular manufacturing technique employed to form the substrate may vary according to the application and purpose to which the final 3D graphene architecture will be employed, without departing from the scope of the present disclosures. The foregoing exemplary additive manufacturing techniques are preferred for the purposes of the present descriptions in part due to the capability of forming complex 3D structures with precise control over feature size and resolution, e.g. resolved features on a scale of approximately 100-400 nm (e.g. TPP), from several hundred nanometers to several microns (e.g. DIW), etc. as will be appreciated by a person having ordinary skill in the art upon reading the present disclosures.

Accordingly, inventive structures and method of forming the same will be presented in the context of micro- and nanoscale embodiments and associated techniques. However, it should be noted that other, particularly larger, scales may be employed without departing from the scope of the instant disclosure.

Several exemplary embodiments of illustrative 3D graphene architectures, and the 3D printed substrates utilized to fabricate the graphene architectures, using various techniques referenced above will be described in further detail below with reference to FIGS. 3A-5C.

Figure 3A:
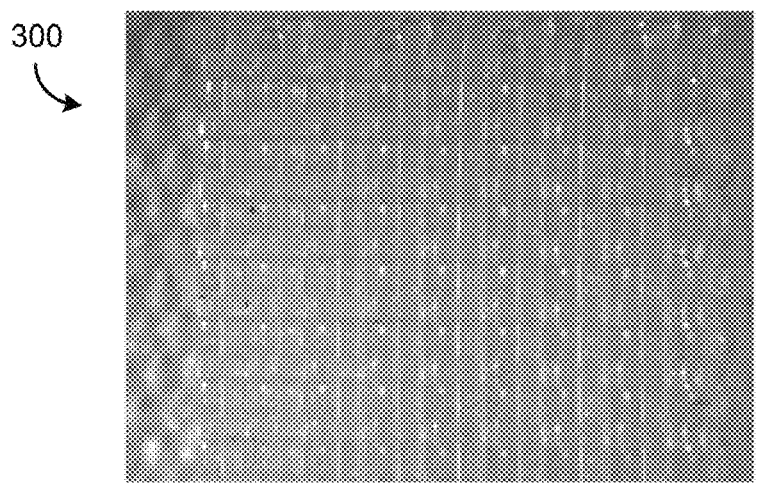
FIG. 3A is an image of a 3D printed substrate produced by direct ink writing (DIW) and suitable for forming a 3D graphene architecture exhibiting a deterministic structure, according to one embodiment.
Figure 3B:
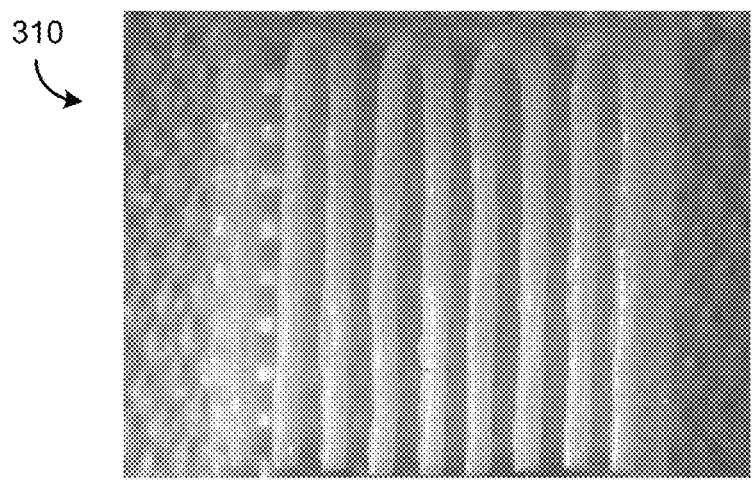
FIG. 3B is an image of an air-burnt 3D printed substrate produced by direct ink writing (DIW) and suitable for forming a 3D graphene architecture exhibiting a deterministic structure, according to one embodiment.
Figure 3C:
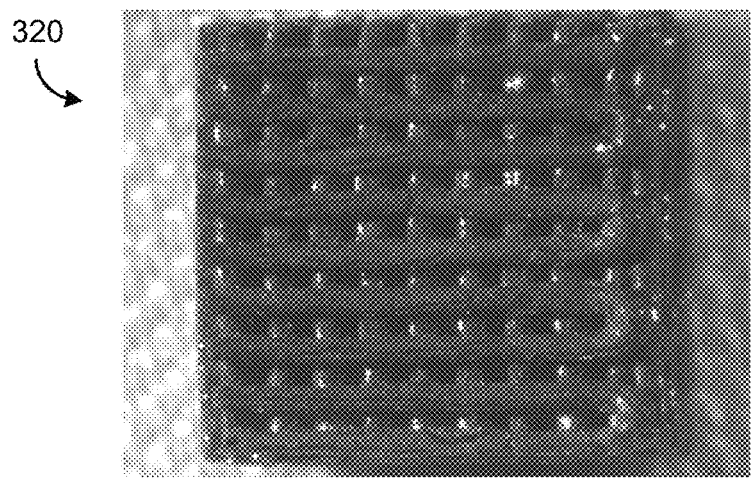
FIG. 3C is an image of a 3D printed substrate produced by direct ink writing (DIW) and having formed thereon porous graphene layer to produce a 3D graphene architecture exhibiting a deterministic structure, according to one embodiment.

Turning first to FIGS. 3A-3C, three exemplary embodiments of a 3D printed substrate (FIGS. 3A-3B) formed via DIW, and having deposited thereon one or more layers of graphene (FIG. 3C) are shown.

FIG. 3A depicts the 3D printed substrate 300 as formed via DIW, according to one embodiment, while FIG. 3B depicts the same 3D printed substrate after curing, e.g. drying/burning in air with optional application of elevated temperature to produce a rigid structure 310. As will be appreciated by skilled artisans, the curing process may cause some deformations in the structure 310 relative to the 3D printed substrate 300 (e.g. shrinking of the bulk, contraction of individual ligaments, etc.), but structure 310 is a substantially identical spatial arrangement of ligaments as the 3D printed substrate 300. Particular details of the curing process are beyond the scope of the inventive concepts presented herein, and any known technique for DIW and optional curing may be employed to form a 3D printed substrate, without departing from the scope of the present disclosure.

The structure 310 may be, and most preferably is, functionalized with a catalyst, e.g. a metal, to facilitate subsequent formation of graphene on the structure 310 and/or formation of graphene into an architecture having a structure substantially defined by the structure 310. For instance, and as will be discussed in further detail regarding FIGS. 5B and 7, the structure 310 may have surfaces thereof coated with one or more layers of a metal or multiple different metals, to facilitate subsequent deposition of carbon and formation of one or more graphene layers on the metal-coated surfaces of the structure.

Whether employing a catalyst as described above, or using other known techniques that a skilled artisan will appreciate are suitable upon reading the present description, one or more layers of graphene are formed on the structure 310, resulting in an ordered 3D graphene architecture 320 as shown in FIG. 3C. In various embodiments, products including an ordered 3D graphene architecture may optionally include the structure 310 and/or catalyst formed thereon. However, in preferred approaches the structure 310 and any catalyst formed thereon are removed, leaving an ordered 3D architecture substantially consisting of graphene, most preferably consisting entirely of graphene.

Accordingly, in preferred embodiments, any 3D printed substrate (cured or uncured) and associated catalyst used as a substrate for forming graphene thereon may be considered sacrificial, and are excluded from the final ordered 3D graphene architecture. In some embodiments, and with continuing reference to FIG. 3C, the graphene formed on the substrate may be a porous layered structure. In more embodiments, and as shown and described in further detail below regarding FIGS. 6A-6C, the graphene is preferably formed on inner and outer surfaces of the metal catalyst, resulting in a two-layer structure. Conventional CVD-based techniques for forming graphene on template structures, by contrast, results in a single layer of graphene formed on outer surfaces of the template.

Figure 4A:
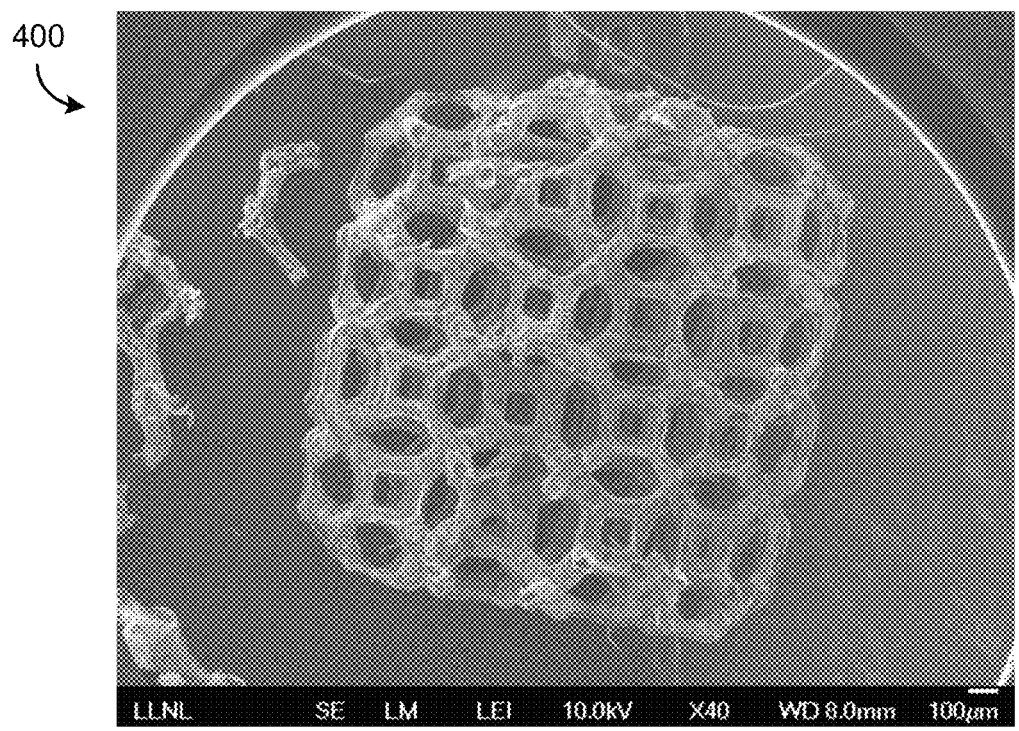
FIG. 4A is a SEM image of a Kelvin foam made of carbon hollow tubes after Ni assisted pyrolysis of a polymer substrate by projection microstereolithography
Figure 4B:
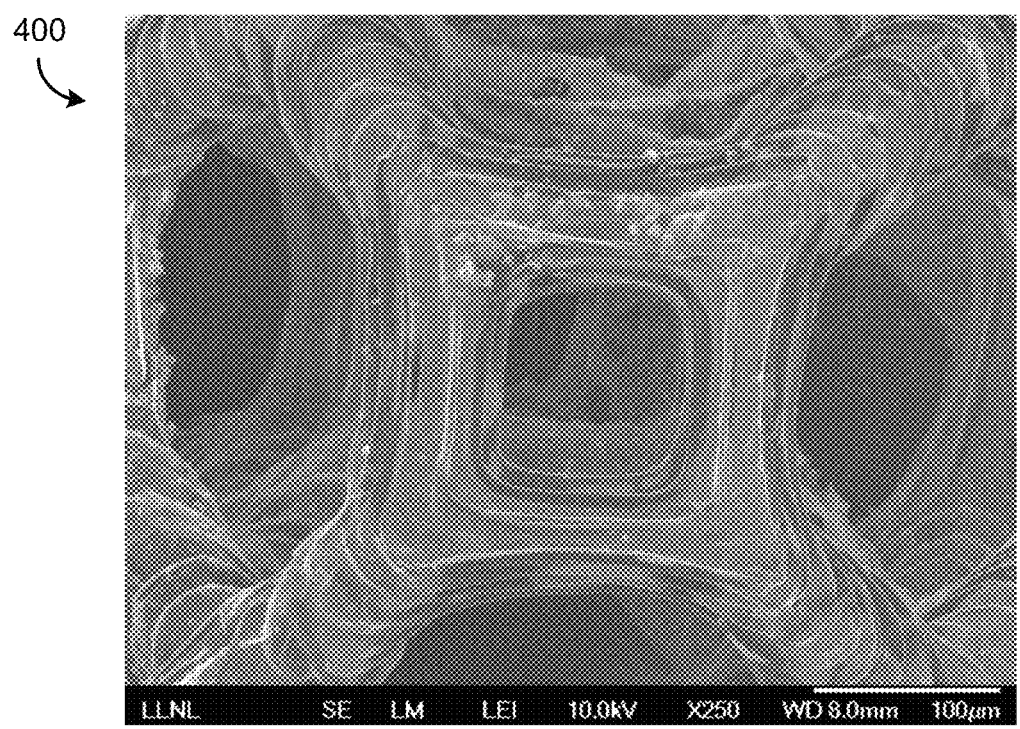
FIG. 4B, is a zoomed-in SEM image of the Kelvin foam made of carbon hollow tubes as shown in FIG. 4A, according to one embodiment.

Turning now to FIGS. 4A-4B, SEM images of a Kelvin foam 400 made of hollow tubes of carbon formed using PμSL following nickel-assisted pyrolysis of a polymer substrate, according to one exemplary embodiment. The foam 400 comprises a plurality of layers of a polymer material and is formed using known PμSL techniques. The foam 400 comprises a plurality of features, e.g. a plurality of open, square faces connected at the corners via ligaments as shown in FIG. 4B, and arranged into the complex, ordered structure shown in FIG. 4A. The polymer substrate may include one or more polymers suitable for forming carbon via pyrolysis thereof, in various embodiments, such as hexanediol diacrylate (HDDA), polyethylene glycol diacrylate (PEGDA), poly(methyl methacrylate) (PMMA), etc. as would be appreciated by a person having ordinary skill in the art upon reading the present descriptions.

Figure 4C:
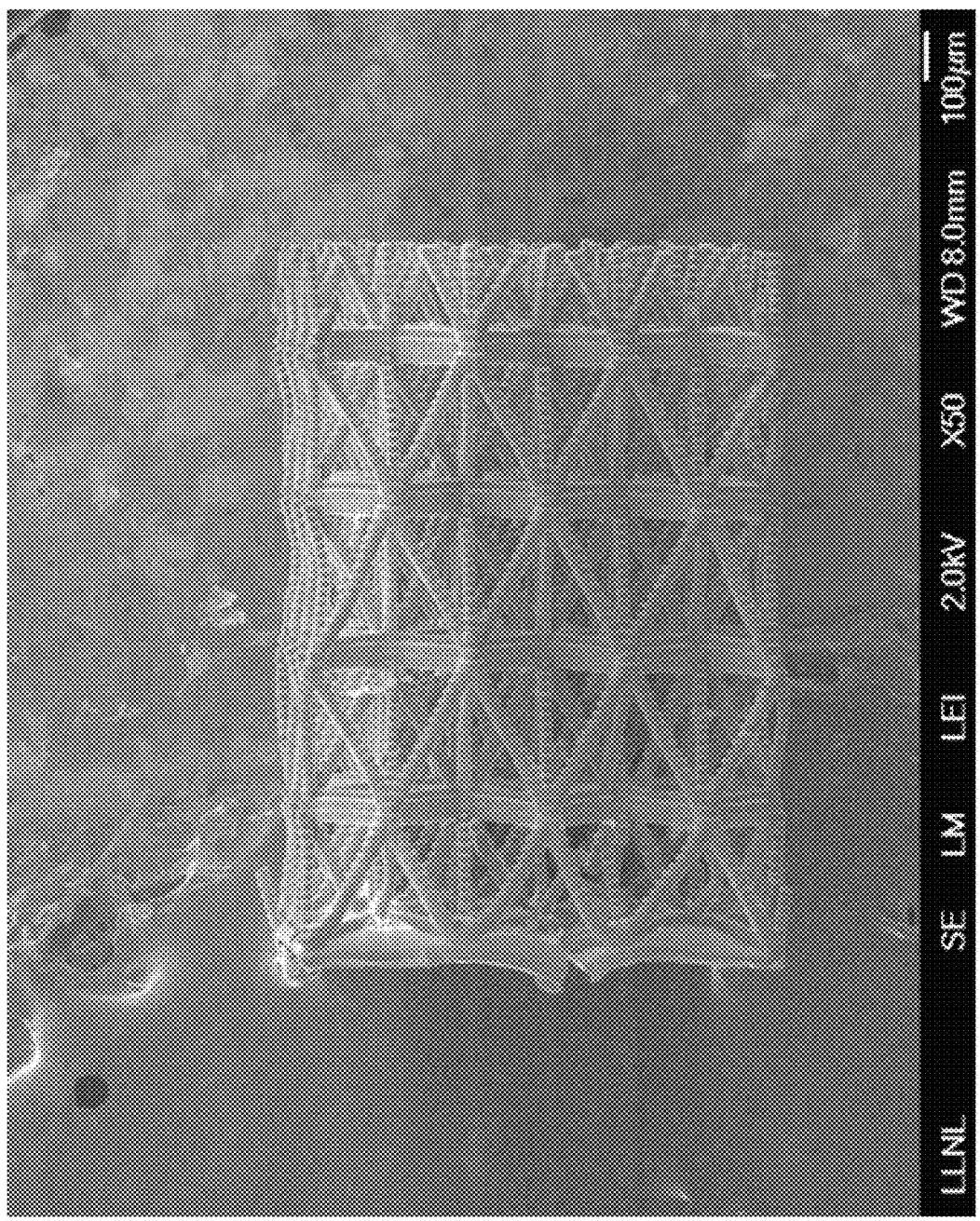
FIG. 4C is a SEM image of a 3D printed substrate in the form of a truss having formed thereon a nickel coating, according to one embodiment.

Another exemplary embodiment of a complex, ordered structure is shown in FIG. 4C, which depicts a truss 410 arranged in a cylindrical fashion. The truss 410 as shown in FIG. 4C is coated with a metal layer, e.g. nickel, to facilitate subsequent formation of graphene thereon.

The foregoing figures and descriptions are provided to demonstrate that the particular ordering of 3D graphene architectures produced according to the presently disclosed inventive concepts includes a diverse array of predefined structures. These structures may range from relatively simple designs (e.g. a simple 3D polygon such as a cube) to highly complex arrangements such as shown in FIGS. 4A-4C, and include designs of intermediate complexity, e.g. one or more layers of a square lattice such as shown in FIGS. 2A-3C and 5A-5C.

Figure 5A:
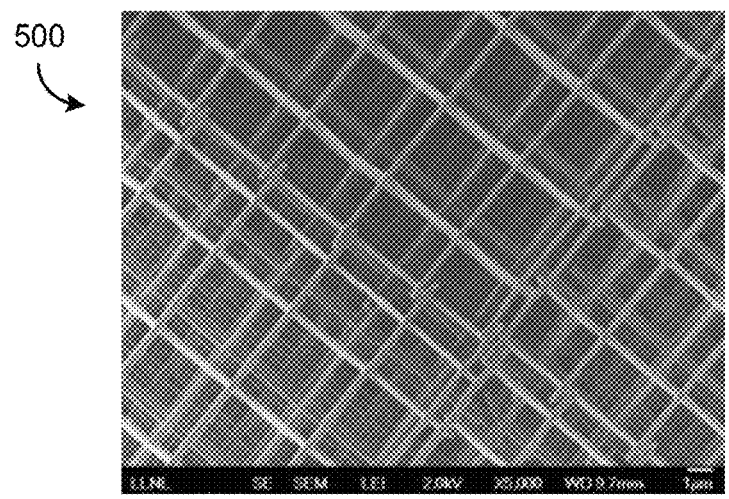
FIG. 5A is a SEM image of a 3D printed substrate produced by two-photon polymerization stereolithography and suitable for forming a 3D graphene architecture exhibiting an ordered structure, according to yet another embodiment.
Figure 5B:
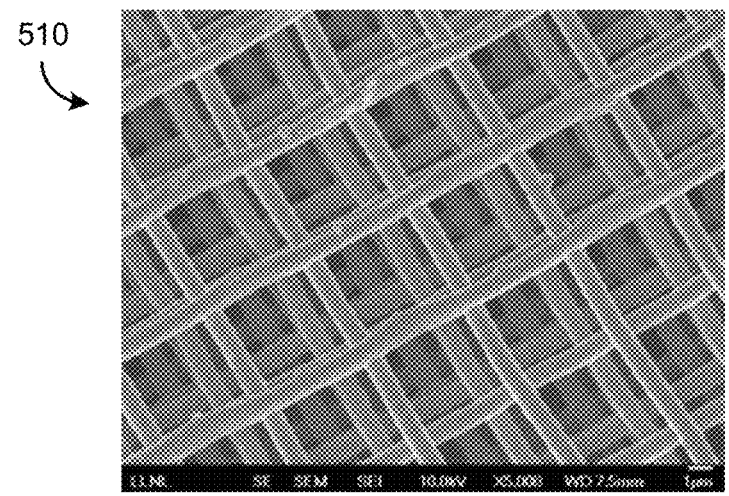
FIG. 5B is a SEM image of the 3D printed substrate shown in FIG. 5A, with a coating of Ni plated onto the 3D printed substrate, according to another embodiment.
Figure 5C:
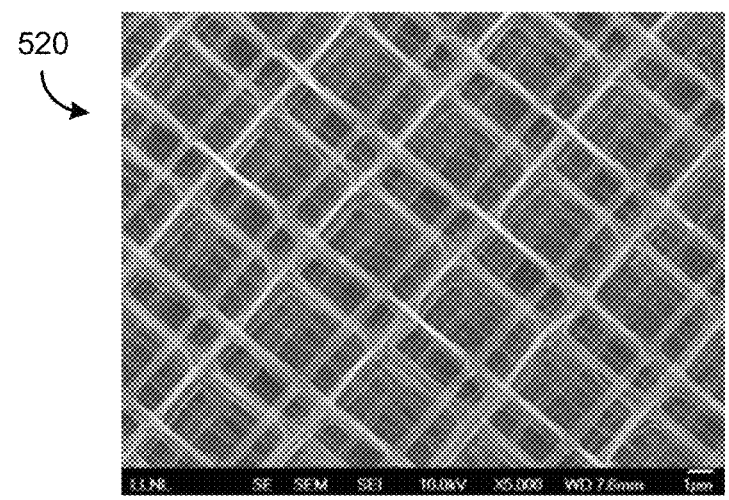
FIG. 5C is a SEM image of a "logpile" architecture made of carbon tubes formed using the 3D printed substrate with metal plated thereon as shown in FIG. 5B, according to one embodiment.

Turning now to FIGS. 5A-5C, an exemplary 3D printed substrate and corresponding ordered 3D graphene architecture are shown, according to one embodiment. In FIGS. 5A-5C, the 3D printed substrate 500 is formed using 2PP direct laser writing, and thus is characterized by features having an "ultra-high" resolution on a scale from approximately 100 nm to approximately 400 nm.

As can be seen from FIG. 5A, the 3D printed substrate 500 again is provided in the form of a square lattice arrangement, and may be distinguished from the substrate 300 shown in FIG. 3A primarily on the basis of feature size/resolution, i.e. the substrate 500 produced by 2PP DLW is characterized by a feature size/resolution much finer (e.g. 2-3 orders of magnitude) than the substrate 300 produced by DIW. Accordingly, ordered 3D graphene architectures formed using substrate 500 will also be characterized by a corresponding improvement in feature resolution. As will be appreciated by persons having ordinary skill in the art, in some approaches finer features/higher resolution yields graphene in the final deterministic 3D architecture, and includes fewer defects than embodiments produced using 3D printed substrates formed via DIW.

Continuing now to FIG. 5B, the substrate 500 is shown with a metal coating formed on surfaces thereof, according to one embodiment. In preferred approaches, the metal coating may be formed on the substrate 500 via electroless plating of nickel, copper, or a combination thereof, onto the substrate 500 the resulting structure 510 is characterized by a same ordering as the substrate 500, but with ligaments having increased diameter due to coating with the metal.

As will be described in further detail below regarding FIG. 7, the metal-coated surfaces of the 3D printed substrate are amenable to forming one or more layers of graphene thereon by deposition of carbon. Deposition may be carried out using any suitable technique, but preferably includes pyrolysis of carbon from the polymer template onto the metal coated surfaces.

According to such embodiments, a unique and distinct concentric bilayer structure may be achieved because the carbon may be deposited on both interior and exterior surfaces of the metal layer coating the 3D printed substrate. Subsequently, the metal layer may be removed, e.g. by etching with an appropriate acid solution such as dilute hydrochloric or nitric acid, as would be understood by a skilled artisan reading the present descriptions. The resulting 3D graphene architecture comprises ligaments which each independently comprise hollow, concentric bilayers of graphene, such as shown and described in further detail with reference to FIG. 6A-6C. As described elsewhere herein, the bilayers may independently comprise one or more layers of graphene, or a single layer of graphene, in various embodiments.

In other embodiments, the graphene may be deposited only on outer surfaces of the metal layer coating the substrate, resulting in an architecture comprising ligaments each comprising a shell or hollow layer of graphene. The shell or hollow layer in such embodiments may itself comprise a single layer of graphene, or several (e.g. 3-5) stacked layers of graphene, in various approaches.

In still more embodiments, graphene may be deposited onto interior and/or exterior surfaces of the metal layer, e.g. by removing the 3D printed substrate (optionally including pyrolysis, in which interior surfaces of the metal layer would have graphene deposited on at least portions thereof) and depositing carbon on exterior surfaces of the metal layer using CVD. It should be understood that in various embodiments it is therefore possible to control the particular surfaces of the metal layer that have graphene formed thereon, and form deterministic 3D graphene architectures by depositing graphene on interior surfaces of the metal layer, exterior surfaces of the metal layer, or both.

Preferably, for both single- and bilayer embodiments, at least some of the hollow ligaments are fully enclosed structures, such that the shell(s) or hollow layer(s) completely enclose(s) an interior void space, e.g. form(s) a substantially cylindrical, or other tube-like structure surrounding the interior void space and lacking perforations, cracks, or other breaks in the fully enclosed structure.

Notably, in some approaches the ligaments, whether fully enclosed structures or otherwise, may be intentionally perforated, e.g. using a separate electrochemical etching step after forming the deterministic, 3D graphene architecture and removing the sacrificial 3D printed substrate and metal layer.

The interior void space may optionally be filled by either or both of the 3D printed substrate and/or metal layer coated thereon. In preferred approaches, however, both the 3D printed substrate and metal coating are removed, leaving a composition of matter consisting essentially of the graphene.

FIG. 5C depicts an exemplary SEM image of a deterministic, 3D graphene architecture 520 including ligaments each independently consisting essentially of a single layer, or several (e.g. 3-5) stacked layers of carbon, preferably graphene, the sacrificial 3D printed substrate and metal layer having been removed. As can be gleaned from the SEM image, the architecture 520 retains the deterministic structure defined by the 3D printed substrate (here, a "logpile" structure), and the ligaments thereof are arranged according to a predefined 3D pattern (multiple layers each forming a square lattice according to the embodiment shown in FIG. 5C).

Figure 5D:
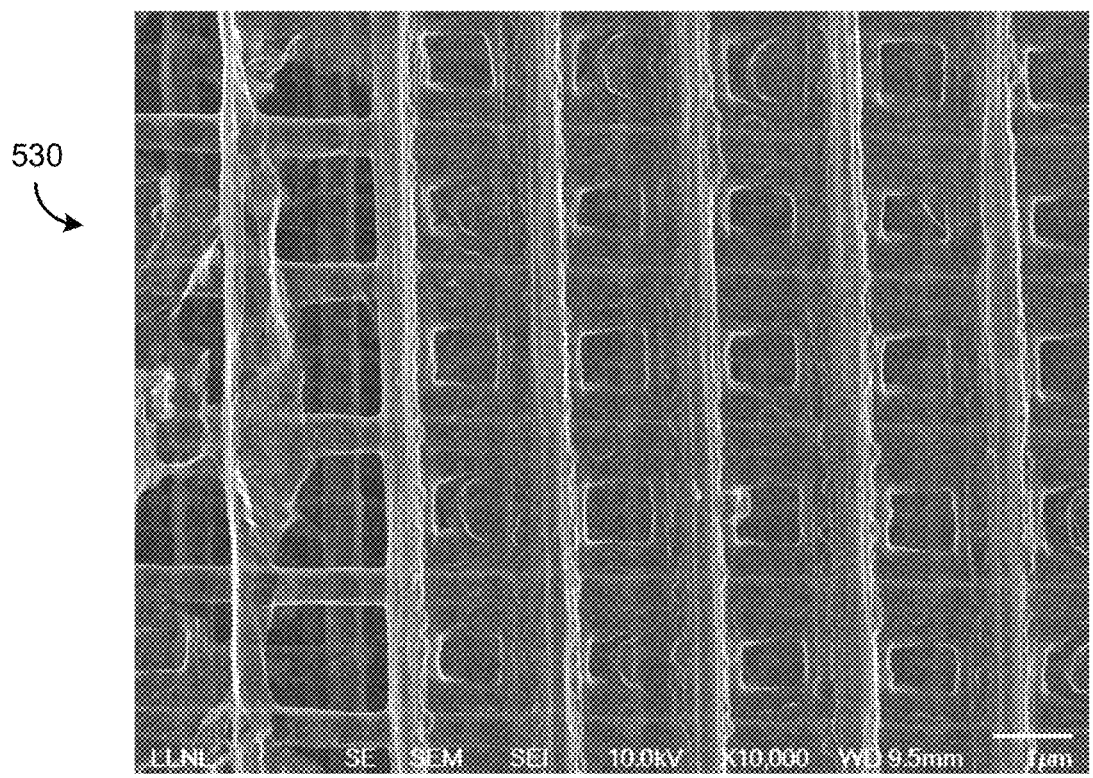
FIGS. 5D-5I are SEM images of a variety of "logpile" architectures formed of carbon tubes using different conditions with regard to spacing in the x-y plane (the plane shown in the images) and exhibiting different densities, according to various embodiments.

Turning now to FIG. 5D, an exemplary embodiment of a "logpile" deterministic architecture 530 of amorphous carbon and/or graphene ligaments is shown in a SEM image. The architecture 530 is characterized by a relative ligament spacing in the x-y plane of approximately two-fold, and a one-fold spacing in the z direction. As a result, the architecture is characterized by a density of approximately 49 mg/cm$^3$.

Figure 5E:
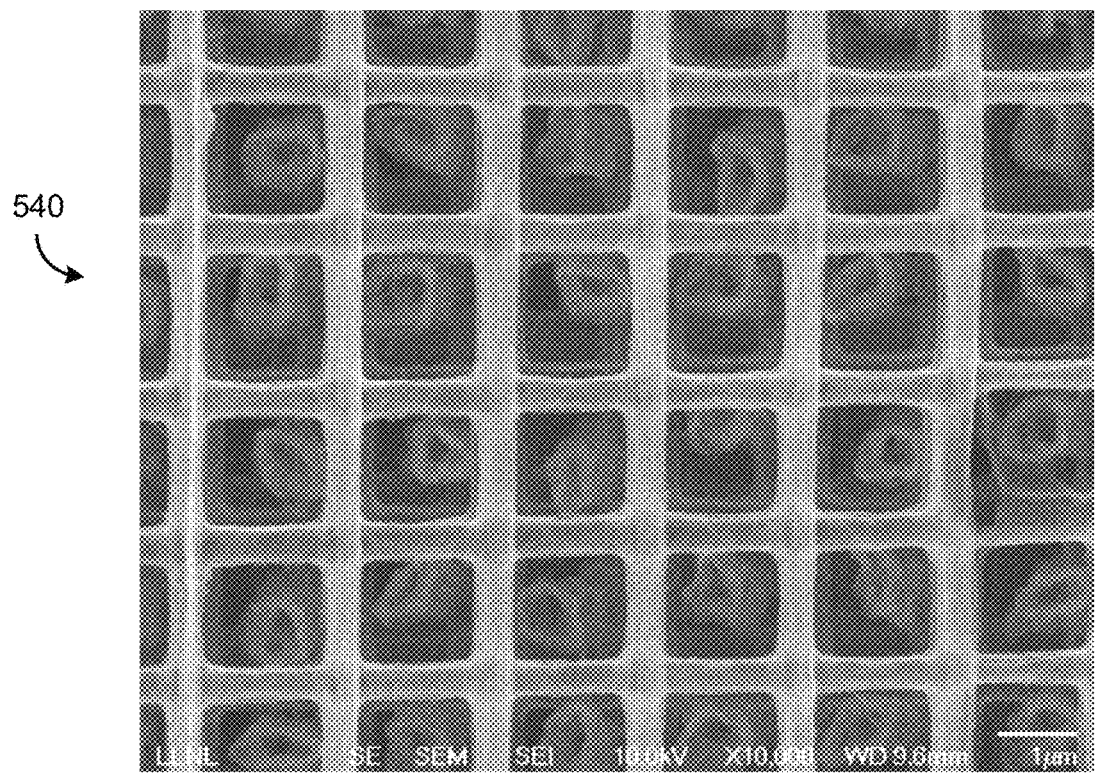

In FIG. 5E, a SEM image of another exemplary embodiment of a "logpile" deterministic architecture 540 comprising ligaments of amorphous carbon and/or graphene is shown. According to the embodiment of FIG. 5E, the architecture 540 is characterized by a relative x-y spacing of approximately 2.5 fold, and a relative z spacing of approximately one-fold. As such, the architecture is characterized by a density of approximately 93 mg/cm$^3$. Although the density of the 3D graphene structures depends on the size and spacing of the primary components (e.g. ligaments), and thus on the specific surface area of the template, density equally depends on the number of graphene layers present in the structure (i.e., the more layers per unit distance in the z direction, the higher the density of the resulting structure).

Figure 5F:
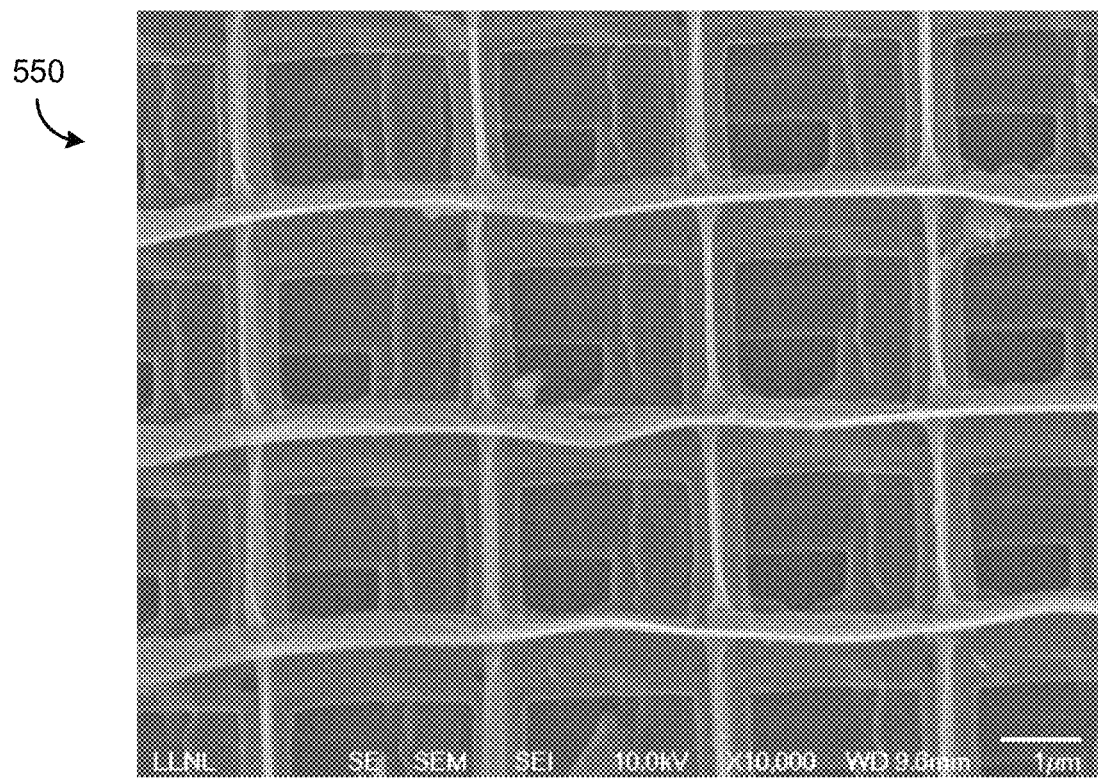

FIG. 5F depicts a SEM image of yet another exemplary embodiment of a "logpile" deterministic architecture 550 comprising ligaments including amorphous carbon and/or graphene. The architecture 550 is characterized by a density of approximately 31 mg/cm$^3$, and a relative x-y spacing of approximately three-fold, with a relative z spacing of approximately one-fold.

Figure 5G:
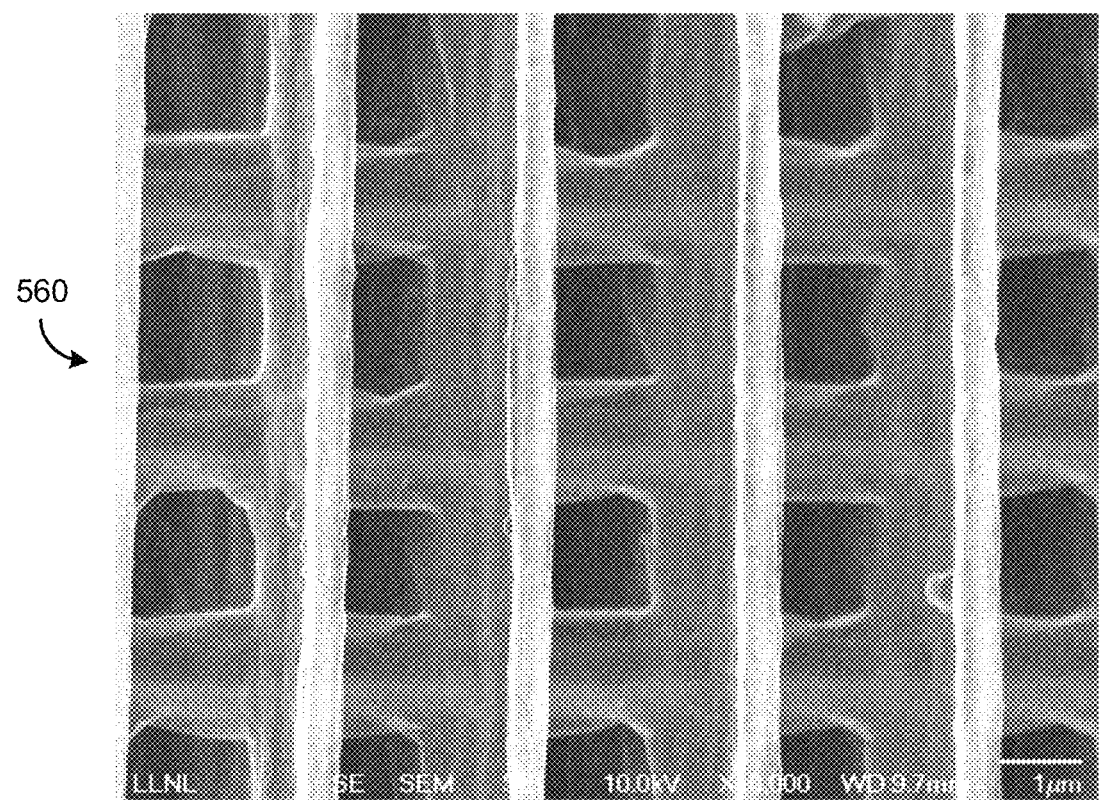

In accordance with still yet another exemplary embodiment of a "logpile" deterministic architecture 560, FIG. 5G shows a SEM image depicting the relative x-y spacing of approximately 3.5-fold and relative z spacing of approximately one-fold. The architecture 560 is accordingly characterized by a density of approximately 27 mg/cm$^3$.

Figure 5H:
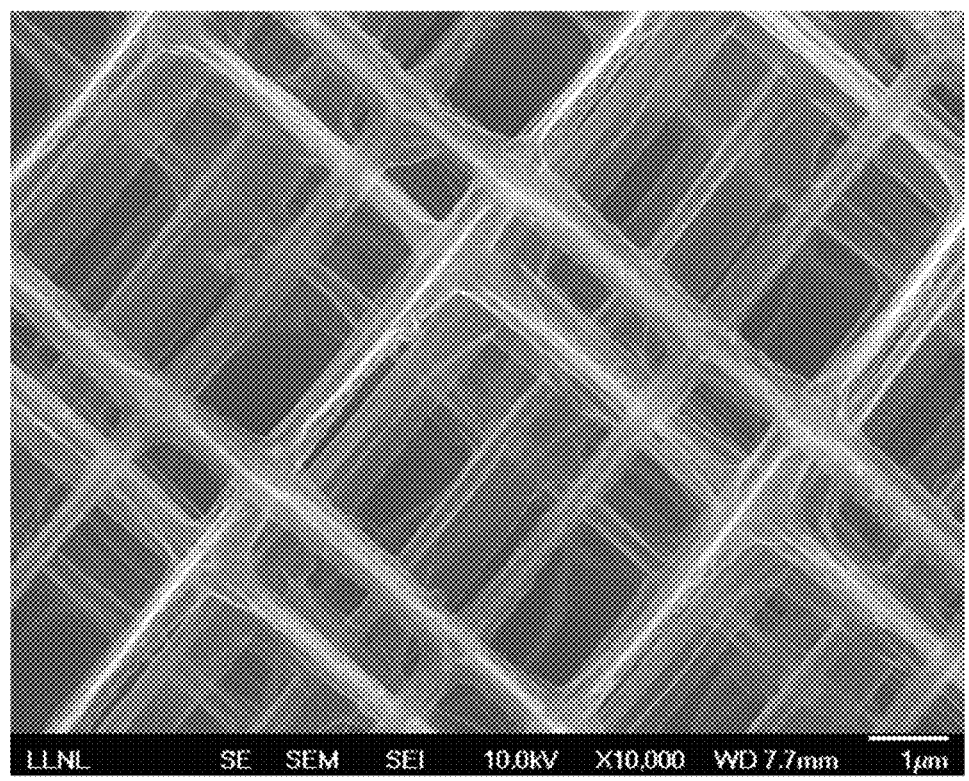

Turning now to FIG. 5H, a SEM image of an exemplary embodiment of a "logpile" deterministic architecture 570 is shown. According to the embodiment of FIG. 5H, the architecture 570 exhibits a density of approximately 18 mg/cm$^3$, and has a relative x-y spacing of approximately 5-fold, with a relative z spacing of approximately one-fold.

Figure 5I:
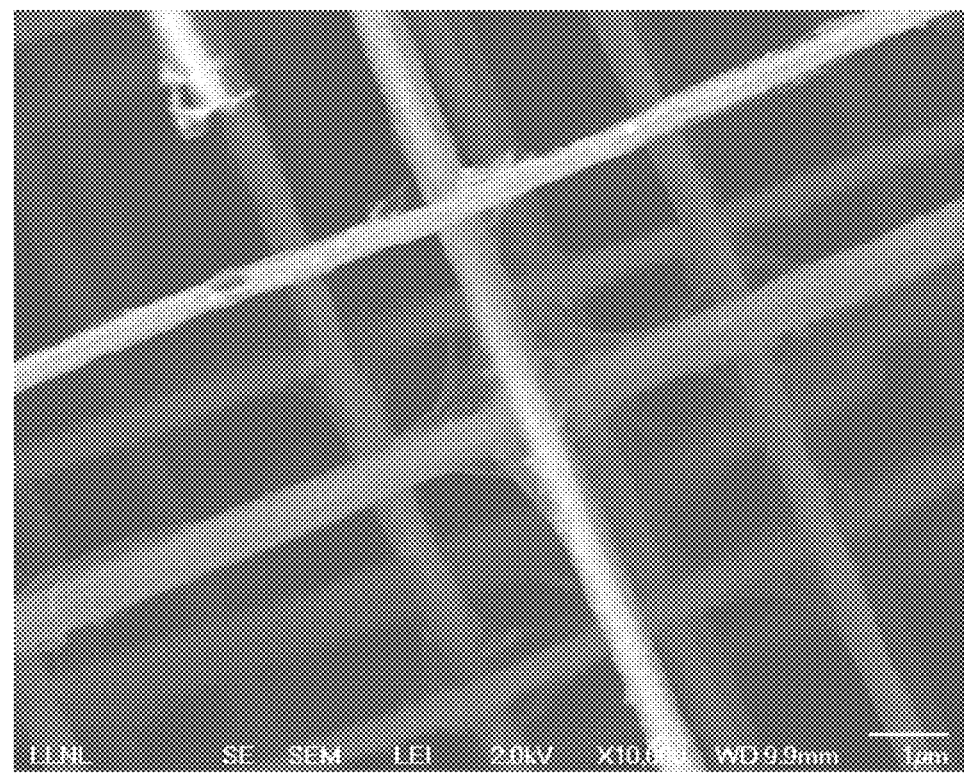

With respect to FIG. 5I, yet another embodiment of a "logpile" deterministic architecture 580 is shown in a SEM image. The architecture 580 according to the embodiment of FIG. 5I is characterized by a relative x-y spacing of approximately ten-fold, a relative z spacing of approximately one-fold, and a density of approximately 17 mg/cm$^3$.

Accordingly, in various embodiments deterministic architectures such as "logpile" configurations may be characterized by a relative x-y spacing in a range from approximately two-fold to approximately ten-fold, and corresponding densities in a range from approximately 15 mg/cm$^3$ to approximately 100 mg/cm$^3$.

Figure 8:
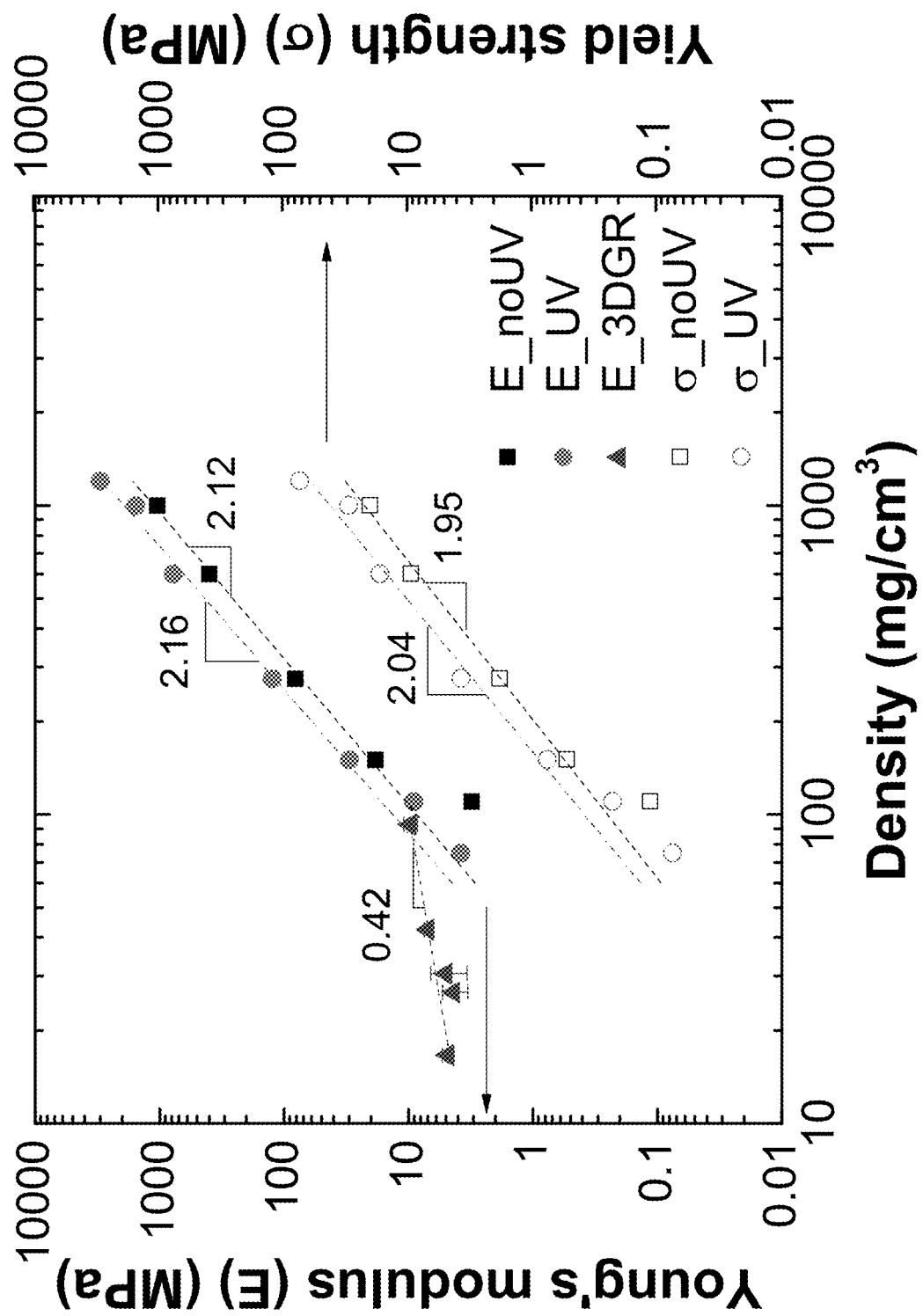
FIG. 8 is a chart depicting a relationship between Young's modulus (E) and yield strength (σ) as a function of density, according to various embodiments of deterministic architectures as described herein.

Moreover, and as represented in the chart depicting a relationship between Young's modulus (E) and yield strength ($\sigma$) as a function of density and as shown in FIG. 8, polymer templates may exhibit mechanical strength properties such as a Young's modulus in a range from approximately 2.0 MPa to approximately 3000 MPa, and a yield strength in a range from approximately 0.1 MPa to approximately 3000 MPa.

According to various embodiments, and particularly those represented in FIG. 8, the relationship between E and $\sigma$ follows a power law of 2 as a function of density ($\rho$). In other words, the young's modulus and/or the yield strength of the structure is proportional to the square of the density of the structure (E$\alpha\rho^2$; and $\sigma\alpha\rho^2$). This observation is consistent with bending dominated deformations seen in log-pile architectures such as those shown in FIGS. 5D-5I.

After conversion into amorphous carbon or graphene, the density of the architecture may be reduced to approximately 10-20% of the values/ranges set forth above with respect to polymer templates (see, e.g. the E_3DGR curve as shown in FIG. 8). Surprisingly, the trend of E vs $\rho$ for pure amorphous carbon or graphene architectures does not follow the trends of E vs $\rho$ and $\sigma$ vs $\rho$ as observed for the printed polymer templates. In particular, the relationships between E and $\rho$ and $\sigma$ vs $\rho$ follow a power law with a coefficient of less than 1.0. Without wishing to be bound to any particular theory, the inventors propose this could be a result of gradual change within deformation modes as the density decreases. The smaller power coefficient associated with the carbon/graphene architectures highlights a pathway to build ultralow density structures with excellent mechanical properties, a previously unexpected and advantageous application of the presently disclosed inventive concepts.

In accordance with several preferred embodiment of a deterministic, 3D graphene architecture, the Young's modulus and yield strength may each be in a range from approximately 2.0 MPa to approximately 10 MPa. Without wishing to be bound to any particular theory, the inventors postulate the preferred embodiments' Young's modulus and yield strength ranges are achieved due to the combination of a deterministic architecture such as a "logpile" structure, and use of ligaments comprising (or preferably consisting of) graphene.

Figure 6C:
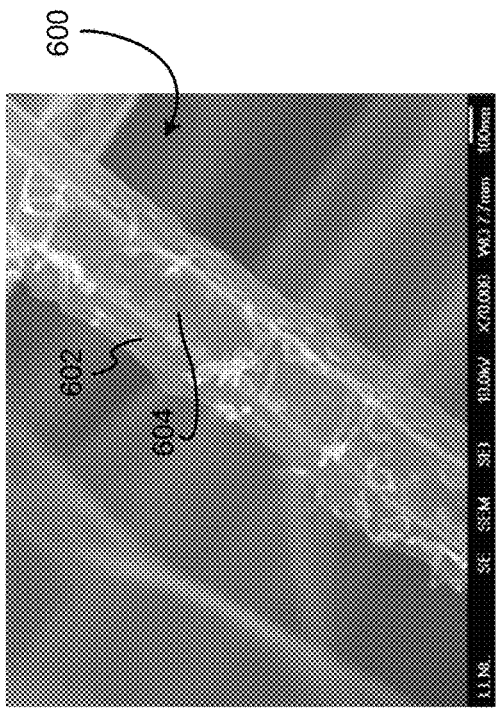
FIG. 6C is a SEM image depicting a side-view of a graphene ligament characterized by concentric, hollow bilayers of a graphene, according to another embodiment.
Figure 6B:
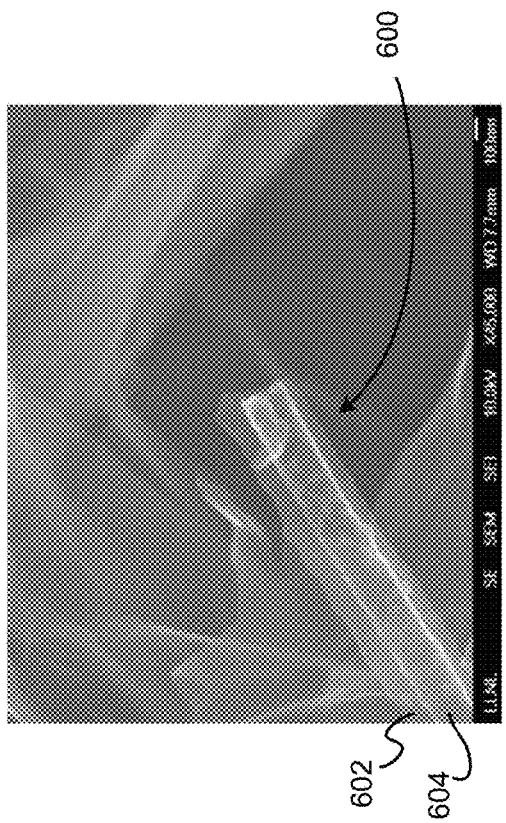
FIG. 6B is a SEM image depicting a side-view of a graphene ligament characterized by concentric, hollow bilayers of a graphene, according to one embodiment.
Figure 6A:
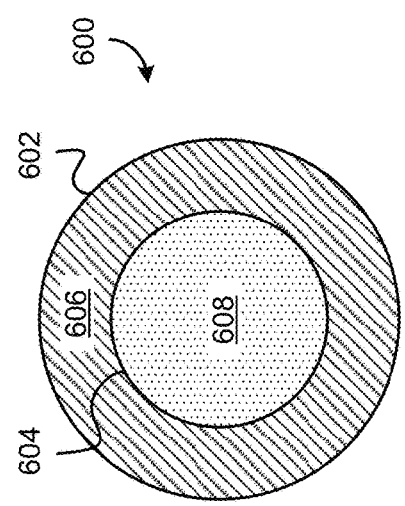
FIG. 6A is a simplified cross-sectional schematic depicting an exemplary structure of concentric, hollow bilayers of a graphene or amorphous carbon ligament within a 3D architecture, according to one embodiment.

Returning now to the notion of a concentric, hollow bilayer structure, FIGS. 6A-6C illustrate the concept schematically, and depict several close-up SEM images of such structures. FIG. 6A shows a cross-sectional, simplified schematic of a ligament 600 characterized by a hollow, concentric bilayer structure. A void 606 exists in the intervening space between exterior layer 602 and interior layer 604 of the ligament 600, and a second, internal void 608 is defined by the interior layer 604. As such, each of the layers 602, 604 is independently hollow, and since the interior layer 604 has a smaller diameter than the exterior layer 602, interior layer 604 fits spatially within the hollow space defined by exterior layer 602. The concentric arrangement of the layers 602, 604 is an artifact of forming each respective layer on the internal or external surface of the sacrificial metal layer, said metal layer being conformally formed onto the 3D printed substrate. The ligaments 600 may be formed of graphene, amorphous carbon, or combinations thereof, in various embodiments.

FIGS. 6B and 6C depict SEM images of ligaments 600 exhibiting a concentric, hollow bilayer structure from a side view, according to several exemplary embodiments.

Accordingly, in various embodiments deterministic 3D graphene architectures as described herein may be embodied as a composition of matter including a plurality of ligaments. Each ligament independently includes one or more layers of graphene, such that the architecture may comprise a single, continuous graphene structure defining a ligament network, or a plurality of graphene structures independently defining various ligaments and cooperatively defining the architecture. In either event, the plurality of ligaments are arranged according to a predefined 3D pattern, e.g. the pattern defined by the structure of the 3D printed substrate used to form the deterministic 3D graphene architecture.

Again, the term "independently" is intended to convey the notion that each of the individual members of the group individually satisfy the stated condition. Accordingly, "portions of the ligaments independently comprising a pair of concentric, hollow bilayers" encompasses embodiments in which the entire network of ligaments comprise a pair of concentric, hollow bilayers, as well as embodiments in which different portions of the ligaments independently comprise different pairs of concentric, hollow bilayers. The bilayers may be continuous throughout the network of ligaments, or may be present in discrete portions of the ligament network, in various approaches.

In some approaches, at least portions of the plurality of ligaments may independently consist of a single layer of graphene. Again, the term "independently" shall be understood to mean each member of the group individually satisfies the stated condition. Accordingly, a composition of matter comprising ligaments, "wherein at least portions of the plurality of ligaments independently consist of a single layer of graphene" refers in one embodiment to multiple, different portions, each of which may consist of a different single layer of graphene. Optionally, in other embodiments some or all of the portions may consist of the same single layer of graphene, e.g. where the plurality of ligaments form a continuous network.

Preferably, the carbon atoms of the portions of the plurality of ligaments independently consisting of single layers of graphene are characterized by $sp^2$ hybridization. Advantageously, maximizing the proportion of the graphene forming the deterministic 3D architecture that exhibits $sp^2$ hybridization conveys desirable electronic properties on the resulting architecture. Accordingly, single graphene layers may be particularly preferred for applications in which the architecture will be employed to perform an electronic function.

As noted above, in some embodiments the plurality of ligaments may be coupled to a metal substrate, e.g. where the graphene is deposited onto the metal layer(s) and prior to removal of the metal via etching or other appropriate technique. Although preferred embodiments consist essentially of the graphene, in some approaches it may be advantageous to retain the metal layer, e.g. for mechanical strength. In preferred approaches, the metal substrate comprises one or more metals selected from nickel and copper. More preferably the one or more metals are electrolessly plated onto surfaces of the 3D-printed substrate, and most preferably onto at least all exterior surfaces of the 3D-printed substrate. In some approaches, e.g. where the 3D printed substrate comprises perforated sections, metal coatings may be formed on interior surfaces of the 3D printed substrate, without limitation.

Similarly, the metal substrate may be coupled to a 3D-printed substrate, which may in turn structurally define the predefined 3D pattern ultimately adopted by the deterministic, 3D graphene architecture. As for the metal substrate, the 3D printed substrate is preferably a sacrificial material that is removed following formation of the graphene ligaments, but may be retained in some approaches. Although any suitable method of forming the 3D-printed substrate may be employed, in preferred embodiments employing the exemplary additive manufacturing techniques referenced herein above, the 3D-printed substrate comprises at least one polymer, e.g. HDDA, PEGDA, DMMA, or other suitable polymers that would be appreciated by a person having ordinary skill in the art upon reading the present descriptions. Most preferably, the 3D-printed substrate comprises a polymer which, under appropriate conditions such as exposure to temperatures in a range from 600° C.-1000° C., engages in a chemical reaction such as pyrolysis to cause deposition of carbon onto interior surfaces of a metal layer coupled to exterior surfaces of the substrate.

Notably, the predefined 3D pattern exhibited by the 3D-printed substrate is a deterministic pattern. The ordering may be simple, or complex, as described hereinabove. Importantly, the predefined 3D pattern is non-random, non-stochastic, and preferably comprises a structure designed by a human user (optionally using appropriate design software to facilitate calculations and predictions of the properties of various possible structures). The predefined 3D pattern is characterized by features each independently having a feature size and/or resolution in a range from about 100 nm to about 10 μm, depending for example on the manufacturing technique used to generate the 3D-printed substrate, as would be understood by a person having ordinary skill in the art upon reading the present disclosure.

In some embodiments, at least portions of the ligaments independently exhibit a gradient in density along at least one axis of the respective portion. In various approaches, the density of the structure (after removing all sacrificial materials including the polymer and metal layer) may be in a range from about 1 mg/cm$^3$ to about 500 mg/cm$^3$, preferably in a range from about 1 mg/cm$^3$ to about 50 mg/cm$^3$ and most preferably in a range from about 1 mg/cm$^3$ to about 10 mg/cm$^3$. The gradient may be present across the graphene architecture as a whole, and/or individual gradients may be present in different portions of the architecture. Gradients may be defined in whole or in part based on the structure of the 3D printed template, and/or based on the operational conditions of forming the graphene on the metal substrate. According to different embodiments, gradients may exist along a longitudinal axis, latitudinal axis, and/or according to more complex 3D patterns defined by the 3D printed template.

In one embodiment, involving printing anisotropic samples such as graded density foams, the density of ligaments in subsequent layers may be modified by changing the spacing between the ligaments, rather than by changing the ligament diameter. The ligament density stays constant and is defined by the density of the polymer or the thickness of the graphene coating. What changes, therefore, is the void fraction of porosity by controlling the number of ligaments per unit volume.

Density gradients may be particularly preferred in certain applications, for instance in measuring and observing high-energy physics. In one approach measuring compression of a structure by X-ray radiation may be accomplished using exemplary architectures as described herein, and such measurements may be facilitated by using an architecture exhibiting a density gradient across the bulk of the structure. For instance, presence of a density gradient smooths the compression front, allowing more precise and/or accurate investigation of the compression phenomenon than where impact creates a shock, as is commonly observed with structures lacking a density gradient. The graded density foam is therefore, in some embodiments, used as a pressure reservoir to more gradually raise the pressure in the material to be measured thus avoiding the formation of a shock wave that would result in much higher sample temperatures and thus different material conditions.

Other applications and advantages of density gradients may include ion separation, e.g. where the architectures described herein may be employed as a molecular sieve and exclude or separate particles on the basis of size. For instance, filtration is an application that benefits from the deterministic character of the described structures, whether ordered or disordered. For filtration one could imagine a structure that resembles the architecture of the filtration organs such as kidneys, which are neither ordered nor random, bur hierarchically structured. Such structures require a deterministically generated template which can only be accomplished by utilizing the additive manufacturing methods described herein.

Still more applications in which a density gradient convey particular advantage will be appreciated by persons having ordinary skill in the art upon reading the present disclosure, and may be pursued using the inventive concepts described herein without departing from the scope thereof.

Figure 7:
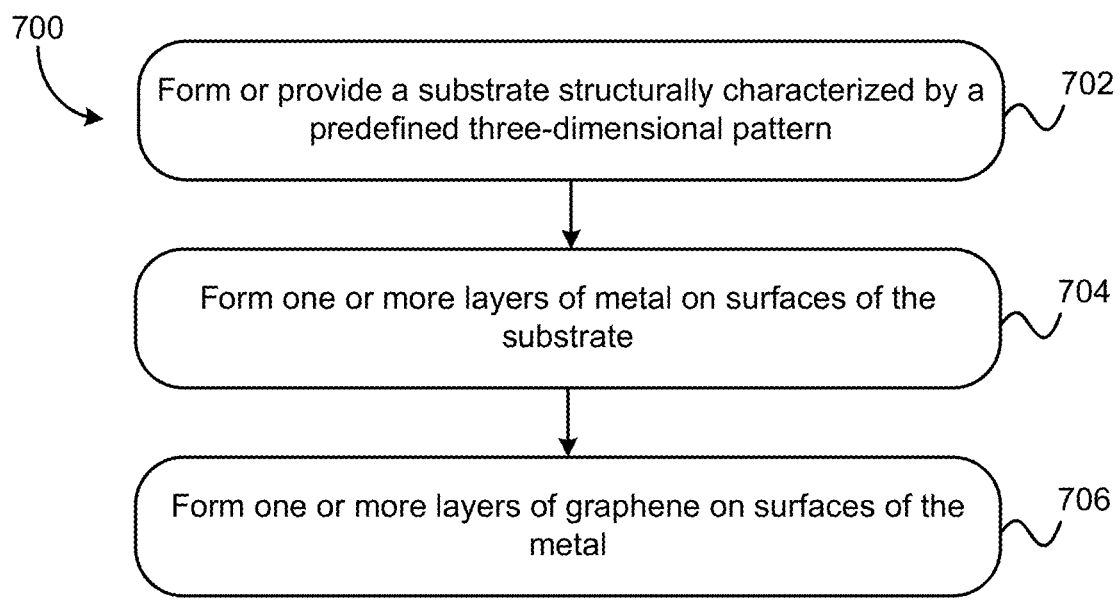
FIG. 7 is a flowchart of a method for forming a 3D graphene architecture characterized by a deterministic structure, according to various embodiments.

In one embodiment, a method 700 for forming a deterministic 3D graphene architecture is shown in FIG. 7. The method 700 may be performed in any suitable environment, and may utilize structures, particularly 3D printed substrates and/or metal coatings thereon, such as shown in FIGS. 3A-5B, among others, in various embodiments.

As shown in FIG. 7, method 700 includes operation 702, in which a substrate structurally characterized by a pre-defined 3D pattern is formed or provided. The substrate is preferably a 3D-printed substrate, and may be formed as part of the method 700 or formed previously and obtained for purposes of creating a deterministic 3D graphene architecture.

In embodiments where operation 702 includes forming the substrate, the process of forming the substrate preferably includes a 3D printing process selected from: direct ink writing (DIW), projection microstereolithography (PμSL), and two-photon polymerization direct laser writing (2PP DLW).

With continuing reference to FIG. 7, method 700 includes operation 704, where one or more layers of metal are formed on surfaces of the substrate. Preferably, the layer(s) is/are formed by plating the metal onto at least exterior surface(s) of the substrate. As will be appreciated by skilled artisans upon reading the present description, the particular location(s) and/or surface(s) where metal layers are formed may be controlled based on the structural configuration of the substrate and/or process and conditions employed to accomplish the formation.

For example, a substrate comprising a substantially closed or solid structure, such as a sphere, a cube, or other polygonal monolith may be coated with metal on only surfaces exterior to the bulk of the structure, while an open structure (e.g. as shown in FIGS. 3A-3C and 4A-4B) may be coated with metal on exterior surfaces of the ligaments, some of which are also external to the bulk of the structure but some of which are internal to the bulk of the structure. Finally, in the case of a substrate having ligaments such as shown in FIG. 4A, but where such ligaments are hollow and access to the interior thereof is available (e.g. porous, hollow ligaments), the metal coating may be formed on both interior and exterior surfaces of the substrate. Accordingly, skilled artisans will appreciate that the presently disclosed inventive concepts include embodiments in which any combination of exterior surfaces (bulk and/or ligament) and/or interior surfaces of the substrate have formed thereon a metal coating.

Similarly, predetermined portions of the substrate may be protected from metal coating being formed thereon, e.g. by coating portions of the substrate with a material resistant to or incompatible with the coating process. Additionally and/or alternatively, a mask or other equivalent mechanism or technique may be employed to selectively coat only portions of the substrate surfaces with metal, in certain applications. According to preferred embodiments, the metal coating is formed on the substrate as a conformal layer or a plurality of conformal layers to a desired thickness.

Accordingly, in one embodiment the one or more layers of metal themselves may have internal surfaces, e.g. surfaces facing the substrate onto which the metal layers are formed, and external surfaces, e.g. surfaces facing away from the substrate.

Further still, in operation 706 of method 700, one or more layers of graphene are formed on surfaces of the metal. Preferably, at least two layers of graphene are formed, one each on the interior and exterior surfaces of the metal. The graphene may be formed using any suitable technique, and preferably is formed as a conformal layer or plurality of conformal layers on the surfaces of the metal. In some approaches, graphene formation may include decomposition and conversion of the polymer template into graphene by the metal catalyst.

The chemical vapor deposition process, in one approach, may include heating a metal coated substrate in an environment of argon gas and hydrogen gas as a catalyst, increasing temperature of the metal coated substrate at a rate of approximately 30° C./min until achieving the final pyrolysis temperature as noted above, e.g. 1000° C. or more, in preferred approaches to maximize the proportion of crystalline graphene formed on the metal surfaces. The argon and hydrogen gas may flow through the chamber at a rate of approximately 500 sccm (Ar) and 50 sccm ($H_2$), respectively.

Upon achieving the final temperature, the temperature and gas flow conditions are preferably held for a predetermined period, e.g. 10 minutes, to ensure the system is thermally stable. Upon ensuring/achieving stability, the gas mixture may be switched to a combination of hydrogen and methane, flowing through the chamber at a respective rate of 50 sccm ($H_2$) and 15 sccm ($CH_4$) for a duration of approximately 20 minutes to pyrolyze the methane into carbon, and deposit carbon and form one or more graphene layers on the exposed, metal-coated surface(s) of the substrate. This deposition process may be repeated for a desired number of cycles, or extended in duration, to deposit additional graphene onto the exposed, metal-coated surface(s) of the substrate.

Following deposition, the gas mixture may be switched back to the argon/hydrogen combination and flow rates employed during the initial heating step. In addition, the system may be cooled to an intermediate temperature, e.g. 500° C., after which the system may be rapidly cooled (e.g. at a rate of approximately 100° C./min) to a temperature of approximately 150° C. Preferably, the argon/hydrogen gas mixture flows continuously during the cooling process.

The foregoing CVD-based process for forming graphene layer(s) onto surfaces of a metal-coated substrate is provided by way of example and should be understood as non-limiting on the scope of the presently disclosed inventive concepts. In various embodiments, other conditions and/or parameters may be employed, such as different flow rates, gas mixtures, temperatures, etc.

In one particular approach, for instance, the process of forming graphene on surfaces of the metal coating may include heating the system to a temperature above a melting point or decomposition temperature of the compound(s) (e.g. polymers) forming the substrate material, preferably to a temperature sufficient to cause the substrate material to undergo pyrolysis and form carbon as a result thereof. Advantageously, such approaches may result in deposition or formation of graphene on both interior and exterior surfaces of the metal layer(s), preferably resulting in a deterministic, 3D graphene architecture comprising a plurality of ligaments which in turn independently comprise concentric, hollow bilayers of graphene such as shown and described with reference to FIGS. 6A-6C above. Accordingly, in such embodiments the material from which the 3D-printed substrate is composed is preferably chosen to be compatible with the pyrolysis conditions (e.g. temperature, gas mixture, flow rate, etc.) to be employed during graphene formation. In various embodiments, suitable materials may include polymers such as HDDA, PEGDA, PMMA, etc. as described elsewhere herein and as would be appreciated by a person having ordinary skill in the art upon reading the present disclosures.

In addition, non-CVD techniques may be employed without departing from the scope of the instant disclosure, including without limitation atomic layer deposition (ALD), sputtering, etc. as would be appreciated by a person having ordinary skill in the art upon reading the present disclosures.

Optionally, but preferably, method 700 may also include removing the one or more layers of metal from the 3D architecture of graphene; and removing the substrate from the 3D architecture of graphene. Removing the sacrificial metal layer(s) and substrate reveals a plurality of ligaments each independently comprising one or more of the layers of graphene. Since the graphene layers were formed on the conformal metal layer(s) coated onto the 3D-printed substrate, the ligaments remain arranged according to the 3D pattern predefined by the 3D-printed substrate following removal thereof. In this manner, the 3D graphene architectures produced according to embodiments of method 700 are preferably deterministic, both prior to and following removal of the sacrificial metal and/or substrate materials.

Removing the metal layer(s) may include etching with a suitable acid solution, such as dilute (e.g. 1-3 M) hydrochloric acid, nitric acid, hydrofluoric acid, etc. as would be understood by a person having ordinary skill in the art upon reading the present disclosures. The particular solution employed to remove the metal layer(s) may be chosen based on the composition of the metal, according to the understanding achieved by persons having ordinary skill in the art upon reading the present disclosure. Preferably, the etching or other removal process is performed using conditions that are inert to the graphene layer(s) formed on the sacrificial metal material.

Removing the substrate may include a heat-based process as described above regarding depositing graphene on interior surfaces of the metal layer. Additionally or alternatively, removing the substrate may be accomplished by etching with a suitable reagent, such as a solution of sodium hydroxide. As for removal of the metal layer, the temperature and/or reagent(s) used to remove the substrate may be chosen based on the composition of the substrate, as would be understood by persons having ordinary skill in the art upon reading the present descriptions. Preferably, the etching or other removal process is performed using conditions that are inert to the graphene layer(s).

In one approach, following formation of the graphene layers and optional removal of the sacrificial metal layer(s) and/or substrate, in preferred approaches the fabrication process includes supercritically freezing and/or drying the plurality of ligaments to yield a deterministic, 3D architecture of graphene.

Uses and Applications

The presently disclosed inventive structures and techniques of forming the same have a wide variety of potential useful applications based in large part on the attractive mechanical and electronic properties of graphene. For example, in one approach the presently disclosed inventive structures may be utilized to explore high-energy density physics, e.g. using the structures as targets for such experiments. In more embodiments, the deterministic 3D graphene architectures described herein may be employed for energy storage, leveraging the electronic capabilities of graphene. Accordingly, the methods of forming such structures may be employed to specifically tailor the structure to the corresponding application, e.g. via modification of the ordering of the structures within the 3D architecture.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A composition of matter, comprising:
    a plurality of ligaments each independently comprising one or more layers of graphene;
    wherein at least portions of the ligaments independently comprise a concentric, hollow bilayer structure; and
    wherein the plurality of ligaments are arranged according to a deterministic three-dimensional (3D) pattern.

2. A composition of matter, comprising:
    a plurality of ligaments each independently comprising one or more layers of graphene; and
    wherein the plurality of ligaments are arranged according to a deterministic three-dimensional (3D) pattern; and
    wherein at least portions of the plurality of ligaments independently consist of a single layer of graphene.

3. The composition of matter as recited in claim 2, wherein the deterministic 3D pattern comprises at least some positive features each independently characterized by a feature size in a range from about 100 nm to about 400 nm.

4. The composition of matter as recited in claim 2, wherein the plurality of ligaments are coupled to a metal substrate.

5. The composition of matter as recited in claim 4, wherein the metal substrate is coupled to a polymeric substrate; and
    wherein the polymeric substrate structurally defines the deterministic 3D pattern.

6. The composition of matter as recited in claim 5, wherein the metal substrate comprises one or more metals selected from nickel and copper, wherein the one or more metals are electrolessly plated onto surfaces of the polymeric substrate.

7. The composition of matter as recited in claim 5, wherein the polymeric substrate comprises at least one polymer selected from the group consisting of hexane diol diacrylate (HDDA), polyethylene glycol diacrylate (PEGDA), and poly(methyl methacrylate) (PMMA).

8. The composition of matter as recited in claim 1, wherein either or both of: the portions of the ligaments, and second portions of the ligaments, are perforated.

9. The composition of matter as recited in claim 1, wherein the deterministic 3D pattern is ordered, and comprises positive features characterized by a feature size of about 100 nm.

10. The composition of matter as recited in claim 1, wherein second portions of the ligaments are hollow.

11. The composition of matter as recited in claim 10, wherein at least some of the second, hollow portions of the ligaments are fully enclosed structures.

12. The composition of matter as recited in claim 2, wherein at least portions of the ligaments independently comprise a pair of concentric, hollow bilayers.

13. The composition of matter as recited in claim 1, wherein at least portions of the deterministic 3D pattern exhibit a gradient in density along at least one axis thereof; and
wherein the ligaments are characterized by a constant ligament density along the at least one axis.

14. The composition of matter as recited in claim 1, wherein the concentric, hollow bilayer structure comprises:
an exterior ligament layer;
an interior ligament layer; and
an interstitial void between the exterior ligament layer and the interior ligament layer; and
wherein the exterior ligament layer and the interior ligament layer are characterized by a coaxial arrangement.

15. The composition of matter as recited in claim 1, wherein the concentric, hollow bilayer structure comprises:
an exterior ligament layer surrounding an interior ligament layer along a longitudinal axis thereof;
wherein the exterior ligament layer and the interior ligament layer are arranged to form a first, interstitial void therebetween; and
wherein an inner surface of the interior ligament layer defines a second void interior to the interior ligament layer.

16. The composition of matter as recited in claim 1, wherein the composition of matter is characterized by a density in a range from about 1 mg/cm$^3$ to about 500 mg/cm$^3$.

17. The composition of matter as recited in claim 1, wherein the deterministic three-dimensional (3D) pattern is characterized by a logpile architecture; and wherein the logpile architecture is characterized by an x/y-axis ligament spacing in a range from about two fold to about ten fold.

18. The composition of matter as recited in claim 17, wherein the logpile architecture is characterized by a z-axis ligament spacing of about one fold.

19. The composition of matter as recited in claim 1, wherein the plurality of ligaments are coupled to a perforated polymeric substrate.

* * * * *